United States Patent
Sai et al.

(10) Patent No.: US 12,457,047 B2
(45) Date of Patent: Oct. 28, 2025

(54) METHOD AND DEVICE FOR DETECTING AND LOCALIZING FAULTS IN AN ANTENNA ARRAY, AND TEST SYSTEM

(71) Applicant: Rohde & Schwarz GmbH & Co. KG, Munich (DE)

(72) Inventors: Marwa Sai, Munich (DE); Andrew Schaefer, Oberhaching (DE); Benoit Derat, Munich (DE); Adam Tankielun, Ottobrunn (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 360 days.

(21) Appl. No.: 18/166,559

(22) Filed: Feb. 9, 2023

(65) Prior Publication Data

US 2024/0275503 A1    Aug. 15, 2024

(51) Int. Cl.
*H04B 17/17* (2015.01)
*H01Q 21/24* (2006.01)

(52) U.S. Cl.
CPC ............ *H04B 17/17* (2015.01); *H01Q 21/24* (2013.01)

(58) Field of Classification Search
CPC ................................. H04B 17/17; H01Q 21/24
USPC .... 324/114, 500, 512, 523, 600, 713, 76.11, 324/76.39
See application file for complete search history.

(56) References Cited

U.S. PATENT DOCUMENTS

| | | | |
|---|---|---|---|
| 10,908,980 B2 | 2/2021 | Derat et al. | |
| 11,303,041 B2* | 4/2022 | Smyth | H01Q 3/2605 |
| 2009/0115662 A1* | 5/2009 | Edwards | G01S 1/16 |
| | | | 342/413 |
| 2011/0199707 A1* | 8/2011 | Kazemi | H02H 7/20 |
| | | | 361/47 |
| 2017/0026205 A1* | 1/2017 | Agee | H04L 27/264 |
| 2019/0079176 A1* | 3/2019 | Weissman | G01S 5/0036 |
| 2020/0321922 A1* | 10/2020 | Strzalkowski | H03F 1/523 |
| 2022/0137119 A1* | 5/2022 | Franke | G01R 31/088 |
| | | | 324/512 |
| 2023/0376026 A1* | 11/2023 | Zhang | G06N 3/0442 |

FOREIGN PATENT DOCUMENTS

CN        110873825 A        3/2020

* cited by examiner

*Primary Examiner* — Huy Q Phan
*Assistant Examiner* — Trung Q Nguyen
(74) *Attorney, Agent, or Firm* — Westman, Champlin & Koehler, P.A.

(57) ABSTRACT

A computer-implemented method for detecting and localizing faults in an antenna array comprises performing fault detection on the antenna array to identify the presence of at least one faulty antenna element of the antenna array. The fault detection is performed using a machine learning technique. It is determined whether the antenna array is faulty or non-faulty, based on a result of the performed fault detection. The at least one faulty antenna element is localized if the antenna array is determined to be faulty, using a machine learning technique.

13 Claims, 2 Drawing Sheets

METHOD AND DEVICE FOR DETECTING AND LOCALIZING FAULTS IN AN ANTENNA ARRAY, AND TEST SYSTEM

TECHNICAL FIELD

The present invention relates to methods and devices for detecting and localizing faults in an antenna array, and to test systems for testing antenna arrays. The invention relates in particular to antenna arrays in base stations.

BACKGROUND OF THE INVENTION

Although applicable in principle to any antenna array, the present invention and its underlying problem will be hereinafter described in combination with a base station comprising an antenna array.

Antenna arrays of base stations comprise a large number of antenna elements which are operated together to radiate with a desired radiation pattern. Faulty antenna elements in antenna arrays lead to a distortion of the total radiation pattern of the antenna array. In the base station, several faults may appear. The faults can be differentiated into hard faults, where at least one antenna element does not radiate at all, and soft faults, where at least one antenna element does not radiate correctly. Another possible differentiation is between isolated faults, where a single isolated antenna element is not working properly, and block faults, where antenna elements are connected in a blockwise manner and at least one of the blocks is defect.

The large number of base stations installed in order to increase channel efficiencies makes the maintenance costs in production and operations costlier. Antenna arrays with many antennas are also difficult to monitor due to high complexity, the small size of the antennas and costs of the needed monitoring measurements.

Failures of antenna elements can be identified already during the production process to avoid improper functioning of the base station. A possible approach is to simulate the patterns of all different combinations of potential failures and to compute a distance metric to the pattern which is actually measured. However, this approach can become computationally expensive due to the combinatorial nature of the problem.

In brute force methods, each antenna element is measured separately. This approach can work for hard failures but is limited if the fault happens because of overheating and scattering effects when all the antenna elements are activated.

In reconstruction approaches for fault detection, a transformation from near field (NF) to far field (FF) is performed. The far-field data is then processed with inverse source electromagnetic or mathematical methods to reconstruct quantities such as the source currents at the antenna array plane or volume. A high number of measurements, parameters, and computations are required in such approaches.

U.S. Pat. No. 10,908,980 B2 relates to a method for detecting faulty devices. Data in the NF region with respect to a device under test is gathered and extrapolated to FF conditions, using machine learning techniques. An FF performance of the device under test is evaluated.

Against this background, the problem addressed by the present invention is to provide an efficient way to determine whether an antenna array is faulty and to localize faulty antenna elements in a faulty antenna array.

SUMMARY OF THE INVENTION

The present invention solves this problem by a computer-implemented method and a device for detecting and localizing faults in an antenna array as recited in the independent claims. Further embodiments are subject matter of the dependent claims.

According to a first aspect, the invention therefore provides a computer-implemented method for detecting and localizing faults in an antenna array. Fault detection is performed on the antenna array to identify the presence of at least one faulty antenna element of the antenna array. The fault detection is performed using a machine learning technique. It is determined whether the antenna array is faulty or non-faulty, based on a result of the performed fault detection. The at least one faulty antenna element is localized if the antenna array is determined to be faulty, using a machine learning technique.

According to a second aspect, the invention therefore provides a device for detecting and localizing faults in an antenna array. The device comprises at least one processor, and a memory storing computer-executable instructions that, when executed by the at least one processor, cause the at least one processor to perform fault detection on the antenna array to identify the presence of at least one faulty antenna element of the antenna array, wherein the fault detection is performed using a machine learning technique. The at least one processor further determines whether the antenna array is faulty or non-faulty, based on a result of the performed fault detection. The at least one processor further localizes the at least one faulty antenna element if the antenna array is determined to be faulty, using a machine learning technique.

According to a third aspect, the invention provides a test system for testing antenna arrays, comprising at least one measurement antenna configured to generate measurement data by measuring radiation from an antenna array at sampling measurement points, and further comprising the device according to the second aspect for detecting and localizing faults in the antenna array, using the measurement data generated by the at least one measurement antenna.

The invention provides a way to determine whether an antenna array is not working properly, and, if so, to determine which of the antenna elements of the antenna array is in fact faulty. By using machine learning techniques, the fault detection and localization of the faulty antenna elements can be carried out with high precision and in very short time.

Further, machine learning techniques have the advantage of being able to extrapolate and, therefore, the necessary number of measurements for detection and localization can be reduced.

Another advantage of machine learning techniques is the robustness to imperfect test environments. In other words, because the machine learning techniques can generalize to other test environments, imperfect test environments can also be covered with good precision. For example, the machine learning model learns embedded over-the-air (OTA) chamber characteristics, measurements uncertainty effects, and scattering effects between the antenna elements of the antenna array.

Further, machine learning techniques can be applied in a very cost-effective way to achieve fault detection and localization.

The method can generalize to arbitrary antenna array shapes and settings, including any number of antennas, positioning, and frequencies.

As used in this specification, the expression "faulty" with respect to the antenna array or the antenna elements may relate to antenna elements which are not radiating at all or which are offset in at least one of amplitude and phase. The antenna element may also be misplaced, i.e. the antenna element is not located at the precise intended location.

According to an embodiment of the method for detecting and localizing faults in an antenna array, at least one of the above machine learning techniques comprises a machine learning model which receives measurement data as an input. The measurement data may comprise near-field (NF) measurements and/or far-field (FF) measurements. The measurements may be performed using at least one measurement antenna. The measurement may comprise a step of moving the at least one measurement antenna around the antenna array to generate two-dimensional or three-dimensional measurement data. The measurement may comprise the determination of an amplitude (field strength) and/or phase of the electromagnetic field radiated by the antenna array. The measurement data may also comprise time-series data, e.g., measurements of the amplitude at different subsequent time points. The measurement data may be provided to the machine learning model as input in the form of a vector, matrix or tensor.

According to an embodiment of the method for detecting and localizing faults in an antenna array, the antenna array is part of a device such as a base station. The antenna array can also be an antenna array that is being produced.

According to an embodiment of the method for detecting and localizing faults in an antenna array, the at least one localized faulty antenna element is displayed in a representation of the antenna array on a display. The faulty antenna element can be shown in the form of an antenna vector, i.e., a vector where each entry corresponds to a specific antenna element of the antenna array. The value of the entry corresponds to the state of the antenna element. For example, an entry of "0" expresses that the antenna element is working properly and an entry of "1" expresses that a fault has occurred in the antenna element.

According to an embodiment of the method for detecting and localizing faults in an antenna array, measurement data is generated, using at least one measurement antenna measuring radiation from the antenna array at sampling measurement points. The input to the machine learning models can be based on the measurement data.

According to an embodiment of the method for detecting and localizing faults in an antenna array, a number of the sampling measurement points is optimized, using variance methods and/or stochastic methods, in particular embedded online variance methods or stochastic methods. The necessary simulation or/and measurement space can be analyzed, or in other words explained. Sampling angles corresponding to the measurement points in the measurement space can be ranked by their importance. Herein, the importance is an indicator of how much each sampling point contributed to the methods decision on the detection, localization or estimation of the faults. Thus, the theoretically necessary measurement points for these detections can be reduced. For example, measurement points having a contribution to detection, localization and/or estimation of the fault below a predetermined threshold can be ignored for future measurements, i.e., there are no longer measurements performed at these measurement points.

According to an embodiment of the method for detecting and localizing faults in an antenna array, weights of at least one antenna element are adjusted to achieve a predetermined target radiation of the antenna array on a target field. Adjustment of the weights can also be carried out, e.g., using a machine learning technique. For example, a machine learning model may provide adjustment information as an output for adjusting the weight of the at least one antenna element. For example, the machine learning model may provide an adjustment factor for each antenna element of the antenna array as an output. The adjustment factor can be a complex quantity, comprising both an amplitude and a weight or may relate to the adjustment of only one of amplitude or phase. Fast detection of the weights' magnitudes and phases of faulty antenna elements can be achieved for necessary restoration of the target electric and magnetic fields of the antenna array.

According to an embodiment of the method for detecting and localizing faults in an antenna array, the weights of the identified at least one faulty antenna element are adjusted.

According to an embodiment of the method for detecting and localizing faults in an antenna array, the weights of an antenna element which is not identified to be faulty are adjusted. In other embodiments, both weights of the identified at least one faulty antenna element and weights of an antenna element which is not identified to be faulty are adjusted.

According to an embodiment of the method for detecting and localizing faults in an antenna array, the weights are adjusted using a recursive feedback loop. This helps optimizing the correction process.

According to an embodiment of the method for detecting and localizing faults in an antenna array, the method is carried out during operation of the antenna array in an intended application. For example, the antenna array may be an element of a base station. The method may be carried out while the base station is operating, e.g., communicating with end devices. In this way, the downtime of the base station during operation can be reduced.

According to an embodiment of the method for detecting and localizing faults in an antenna array, a machine learning model is trained, the machine learning model being used for the fault detection and/or the localization of the at least one faulty antenna element. The machine learning model can be trained using simulated data or real data as test data. In other embodiments, both simulated and real data can be used as test data. For example, the real data can be obtained by making measurements on the antenna array during the manufacturing process of the antenna arrays. The measurements can be based on traditional fault detection methods, for example one of the methods described in the introductory section. The efficiency and precision of the machine learning model can be improved using real data.

According to an embodiment of the method for detecting and localizing faults in an antenna array, the machine learning model comprises a deep neural network, DNN.

According to an embodiment of the method for detecting and localizing faults in an antenna array, the machine learning model is trained in a supervised manner. For example, test data can be labeled manually or automatically and can be used to train the machine learning model. In other embodiments, the machine learning model can be trained using semi-supervised learning, unsupervised learning or reinforcement learning.

An advantage of using data generated based on machine learning techniques for the fault localization is that the training of the machine learning model does not need to include all the possible combinations of the failures for the model to extrapolate on different combinations of the failed antenna elements.

According to an embodiment of the method for detecting and localizing faults in an antenna array, the machine learning model is trained using both near-field data and far-field data. In this way, robustness against the type of measurement can be achieved. The machine learning model learns the field transformations in addition to the detection, localization, and estimation of fault values.

According to an embodiment of the method for detecting and localizing faults in an antenna array, a single machine learning model is used for performing fault detection and for localizing the faulty antenna element. In this way, all the information may be achieved at the same time.

According to an embodiment of the method for detecting and localizing faults in an antenna array, two separate machine learning models are used for performing fault detection and for localizing the faulty antenna element. In this way, the machine learning model for localizing the faulty elements may be used only if of a fault has been detected, thereby reducing the computational effort.

According to an embodiment of the method for detecting and localizing faults in an antenna array, a fault type of the localized at least one faulty antenna element is determined, using a machine learning technique. The determination of the fault type might be carried out with a separate machine learning model, i.e., a model other than a machine learning model used for performing fault detection and for localizing the at least one faulty antenna elements. In other embodiments, a single machine learning model can be used which provides all functions of fault detection, localization of the at least one faulty antenna element and of identification of the fault type.

According to an embodiment of the method for detecting and localizing faults in an antenna array, the fault type comprises at least one of soft faults, hard faults, isolated faults and block faults. In an embodiment of the method for detecting and localizing faults in an antenna array, the machine learning model can be trained to differentiate between soft faults and hard faults. For example, the machine learning model may comprise a learning classifier system (LCS), a support-vector machine, or a bayesian-network based model. In embodiments, the machine learning model comprises a deep neural network with a two-state output layer. Similarly, one of the machine learning models just defined can be trained to differentiate between isolated faults and block faults.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
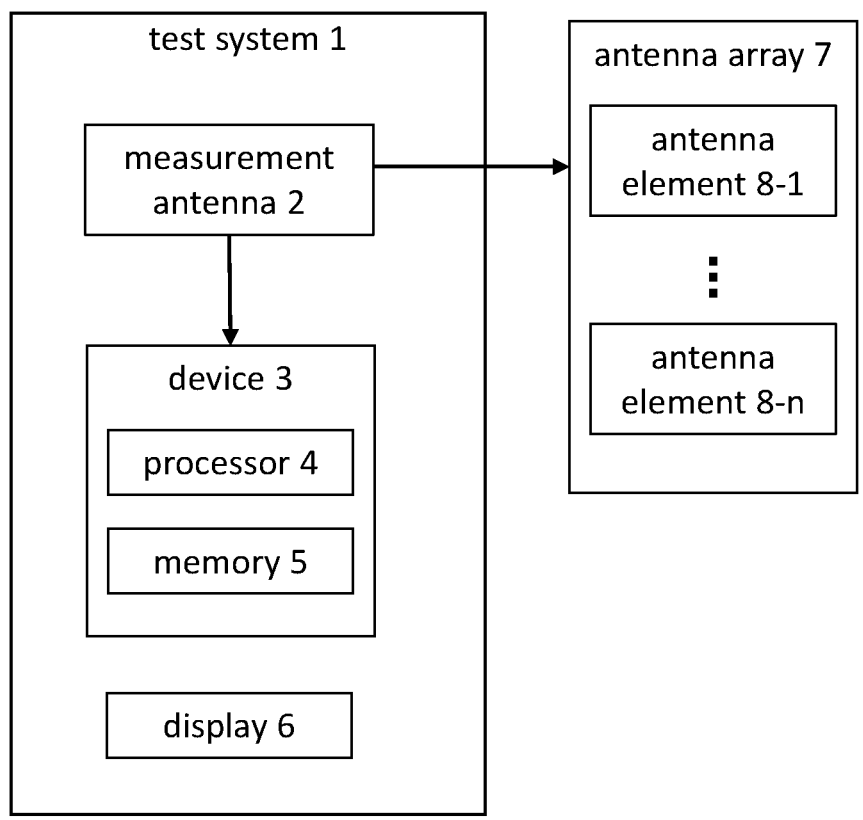
FIG. 1 shows a schematic block diagram of a test system for testing an antenna array according to an embodiment of the invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

DETAILED DESCRIPTION OF THE DRAWINGS

FIG. 1 shows a schematic block diagram of a test system 1 for testing an antenna array 7 with a plurality n of antenna elements 8-1 to 8-$n$. The number n of the antenna elements is not restricted to any particular value.

The antenna array 7 can be a component of a base station. The system 1 may analyze the antenna array 7 during normal operation of the antenna array 7, e.g., to avoid downtime of the base station. The antenna array 7 can also be an antenna array that is being produced, i.e., the test system 1 tests the antenna array 7 during the production process.

The test system 1 comprises at least one measurement antenna 2, e.g., a horn antenna. The at least one measurement antenna 2 can be arranged inside a measurement chamber of the test system 1. The antenna array 7 to be tested can be placed inside the measurement chamber for the measurements.

The at least one measurement antenna 2 generates measurement data by measuring radiation emitted from the antenna array 7 and received at sampling measurement points, i.e., at predetermined locations around the antenna array 7. The at least one measurement antenna 2 may generate NF and/or FF measurement data.

The test system 1 may comprise mountings for the at least one measurement antenna 2 and for the antenna array 7. For example, the mounting of the at least one measurement antenna 2 can be movable to bring the at least one measurement antenna 2 to the predetermined measurement points.

The test system 1 further comprises a device 3 for detecting and localizing faults in the antenna array 7, using the measurement data generated by the at least one measurement antenna 2. The device 3 comprises at least one processor 4, and a memory 5 storing computer-executable instructions.

The at least one processor 4 can comprise at least one of a central processing unit (CPU), graphics processing unit (GPU), microcontroller (µC), integrated circuit (IC), application-specific integrated circuit (ASIC), application-specific standard product (ASSP), digital signal processor (DSP), field programmable gate array (FPGA), and the like.

The memory 5 can be a volatile or non-volatile data memory, e.g., a solid-state disk, memory card or the like.

The device 3 may compute over-the-air (OTA) characteristics of the antenna array 7 based on the measurement data provided by the at least on measurement antenna 2. For example amplitudes and/or phases of the radiation at the specific measurement points can be determined.

The processor 4 performs fault detection on the antenna array 7 to identify the presence of at least one faulty antenna element 8-1 to 8-$n$ of the antenna array 7. The fault detection is performed using a machine learning technique. For example, a first machine learning model is used to perform the fault detection.

The first machine learning model may receive the measurement data as input. The first machine learning model may also receive input which is derived from the measurement data, e.g., the amplitudes and/or phases of the radiation at the measurement points. This input may be provided in the form of a vector, matrix, or tensor.

The first machine learning model can be a deep neural network having an input layer for receiving the input, several hidden layers, and an output layer. The output layer may provide information whether the antenna array 7 is faulty or not. For example, an output of "0" is given if the antenna is faulty and an output of "1" is given if the antenna is not faulty. That is, if an output of "0" is received, the processor 4 can determine that the antenna array 7 is faulty, and if an output of "1" is received, the processor 4 can determine that the antenna array 7 is non-faulty.

The at least one processor 4 further localizes the at least one faulty antenna element 8-1 to 8-*n* if the antenna array 7 is determined to be faulty, using a machine learning technique. For example, the at least one processor 4 can comprise a second machine learning model, e.g., another deep neural network.

The second machine learning model receives input which can be the same input as the input to the first machine learning model. The output of the second machine learning model can be a vector, where each entry corresponds to one of the antenna elements 8-1 to 8-*n*. The value of the entry (e.g. "0" or "1") determines whether the corresponding antenna element 8-1 to 8-*n* is faulty or not.

In other embodiments, there is only a single machine learning model for performing fault detection and for localizing the faulty antenna element, e.g., having the same input layer but having two output layers, one output layer for fault detection and another output layer for localizing the faulty antenna element 8-1 to 8-*n*.

Further, the processor 4 may compute whether the number of the sampling measurement points can be reduced. For example, the processor 4 determines the contribution of the measurement points to the fault detection and/or localization, using e.g., embedded online variance methods or stochastic methods. If a sampling measurement points makes only a small contribution, the measurement points may be removed for future measurements.

The processor 4 can further be configured to determine a fault type of the localized at least one faulty antenna element 8-1 to 8-*n*. The processor 4 may determine the fault type using a third machine learning model, e.g., a deep neural network. The third machine learning model may receive the same input as the first and/or a second machine learning model. The third machine learning model can have an output layer which indicates the type of fault for each antenna element 8-1 to 8-*n*. For example, a vector may be provided as an output, wherein each entry of the vector corresponds to one of the antenna elements 8-1 to 8-*n*. If the antenna element 8-1 to 8-*n* has been determined to be faulty, a value of "0" indicates that the antenna element 8-1 to 8-*n* has a soft fault and a value of "1" indicates that the antenna element 8-1 to 8-*n* has a hard fault.

Further, the second and third machine learning models may be combined into a single machine learning model. For example, a vector may be provided as an output, wherein each entry of the vector corresponds to one of the antenna elements 8-1 to 8-*n*. A value of "0" indicates that the antenna element 8-1 to 8-*n* is non-faulty, a value of "1" indicates that the antenna element 8-1 to 8-*n* has a soft fault, and a value of "2" indicates that the antenna element has a hard fault.

In other embodiments, all of the first to third machine learning models may be combined into a single machine learning model.

Further, the processor 4 may differentiate between other fault types, e.g., between isolated faults and block faults.

The processor 4 may further may further determine adjustment factors for weights of at least one antenna element 8-1 to 8-*n* to achieve a predetermined target radiation of the antenna array 7 on a target field. The weights may be determined using the result of the fault detection and/or localization. Weights of faulty and/or non-faulty antenna elements 8-1 to 8-*n* can be adjusted. The weights can be adjusted using a recursive feedback loop.

Each of the first to third machine learning model is pre-trained. For example, the first to third machine learning models can be trained based on labelled reference measurement data obtained by the at least one measurement antenna 2, i.e., based on supervised learning. The first to third machine learning model can also be trained using semi-supervised learning, unsupervised learning or reinforcement learning.

The test system 1 further comprises a display 6 which can illustrate the faulty antenna element 8-1 to 8-*n*. For example, IDs of the at least one faulty antenna element 8-1 to 8-*n* are shown, or a vector or matrix comprising all of the antenna elements 8-1 to 8-*n* is displayed, where the at least one faulty antenna element 8-1 to 8-*n* is displayed in a highlighted manner, e.g., in a different color.

Figure 2:
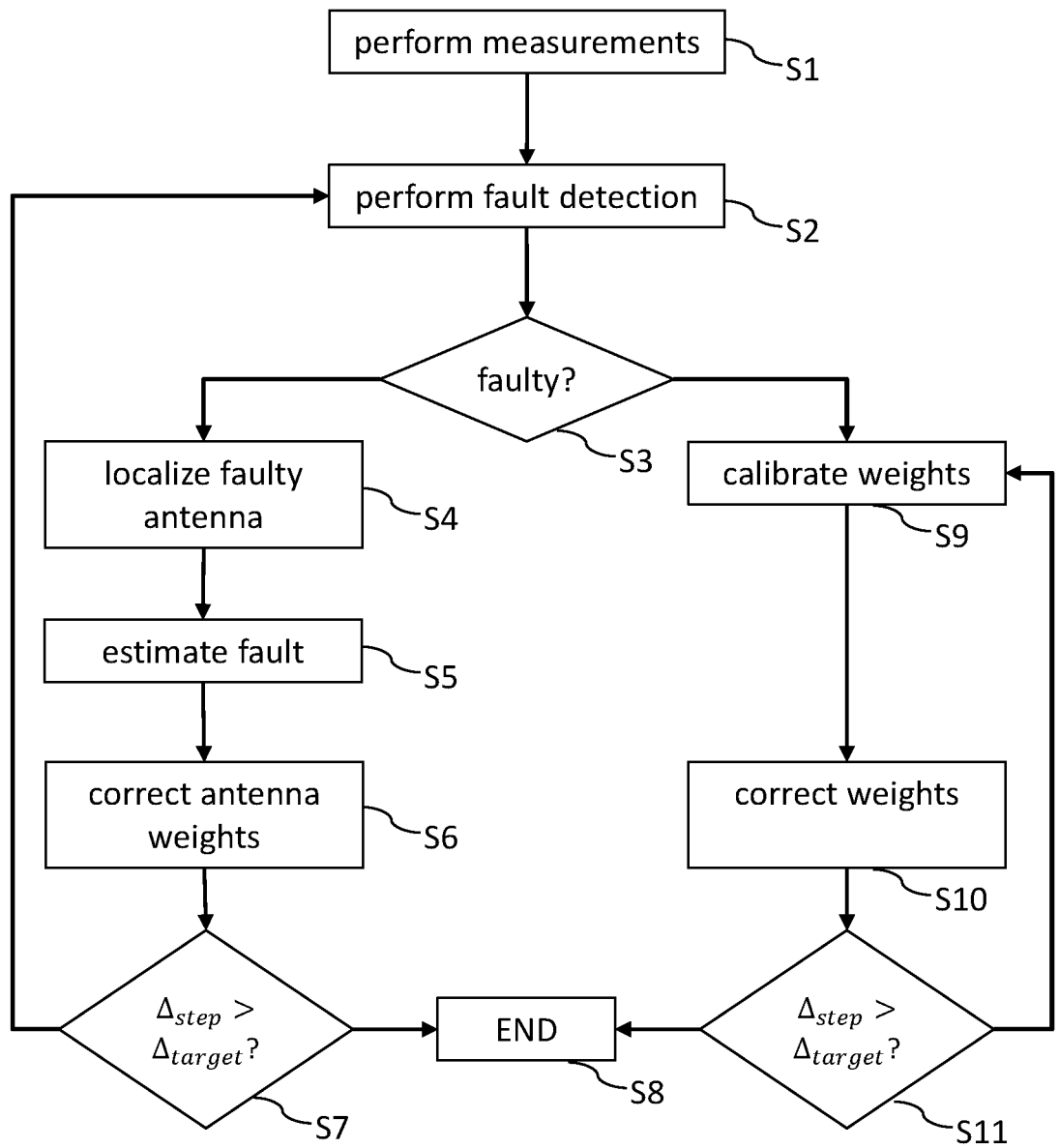
FIG. 2 shows a flow diagram illustrating a method for detecting and localizing faults in an antenna array according to an embodiment of the invention.

FIG. 2 shows a flow diagram illustrating a method for detecting and localizing faults in an antenna array. The method can be carried out during operation of the antenna array 7 in an intended application. For example, the antenna array 7 may be an element of a base station and the method is performed while the base station is operating.

The method can also be performed during the manufacturing process of the antenna array 7. The method may be carried out with the test system 1 described above. In turn, all of the features described above in the context of the test system 1 can be implemented in the method described in the following.

In step S1, measurements are performed on the antenna array 7, e.g., using at least one measurement antenna 2 described above. The measurement can be performed in a measurement chamber. Measurement data is generated, e.g., OTA characteristics of the antenna array 7. For example, amplitudes and/or phases of electromagnetic radiation at each of the plurality of measurement points are determined.

In step S2, fault detection is performed on the antenna array 7 to identify the presence of at least one faulty antenna element 8-1 to 8-*n* of the antenna array 7. The fault detection is performed using a machine learning technique, e.g. using the first machine learning model described above.

In step S3, it is determined whether the antenna array 7 is faulty or non-faulty, based on a result of the performed fault detection.

In step S4, If the antenna array 7 is faulty, the at least one faulty antenna element 8-1 to 8-*n* is localized, using a machine learning technique. For example, localization may be carried out using the above-described second machine learning model.

In step S5, the fault type of the at least one faulty antenna element 8-1 to 8-*n* is identified.

In step S6, antenna weights are corrected based on the result of the fault localization and fault estimation. Phases and/or amplitudes of the antenna weights can be adjusted to achieve a predetermined radiation pattern.

In step S7, it is determined whether a difference $\Delta_{step}$ between a measured radiation field and a target radiation field is greater than a predetermined threshold $\Delta_{target}$. If this is the case, fault detection is repeated, S2. Otherwise, the method ends, S8.

If, in step S3, it has been determined that the antenna array 7 is non-faulty, the weights of the antenna elements 8-1 to 8-*n* are calibrated to match the input target radiation field, S9.

In step S10, the weights of the antenna element 8-1 to 8-*n* are corrected.

In step S11, it is determined whether a difference $\Delta_{step}$ between a measured radiation field and the target radiation field is greater than a predetermined threshold $\Delta_{target}$. If this is the case, fault detection is repeated. Otherwise, the method ends, S8.

The method may further comprise a step of training one of the machine learning models used for fault detection, fault localization and/or fault type estimation. Each of the machine learning models can either be pre-trained or can be trained online, i.e., during operation.

Summarizing, the invention relates to the fast and precise detection and localization of faults of antenna elements and/or antenna arrays. The faults of the antenna elements, in magnitude only, in phase only, or in both magnitude and phase can be corrected and the distortion in the total pattern can be restored, resulting in a complete restoration of the correct/target behavior of the antenna array.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A computer-implemented method for detecting and localizing faults in an antenna array, comprising the steps:
performing fault detection on the antenna array to identify the presence of at least one faulty antenna element of the antenna array, wherein the fault detection is performed using a machine learning technique;
determining whether the antenna array is faulty or non-faulty, based on a result of the performed fault detection; and
localizing the at least one faulty antenna element if the antenna array is determined to be faulty, using a machine learning technique;
wherein the steps of performing fault detection and of localizing the at least one faulty antenna element are based on over-the-air measurement data generated by at least one measurement antenna positioned at multiple sampling points around the antenna array; and
wherein the machine learning technique used for performing fault detection and the machine learning technique used for localizing the at least one faulty antenna element comprise at least one pre-trained deep neural network model outputting fault detection and localization results used to adjust antenna element weights to restore a target radiation pattern.

2. The method according to claim 1, further comprising the step of displaying the at least one localized faulty antenna element in a representation of the antenna array on a display.

3. The method according to claim 1, wherein a number of the sampling measurement points is optimized, using variance methods and/or stochastic methods.

4. The method according to claim 1, wherein the weights of the identified at least one faulty antenna element are adjusted.

5. The method according to claim 1, wherein the weights of an antenna element which is not identified to be faulty are adjusted.

6. The method according to claim 1, wherein the weights are adjusted using a recursive feedback loop.

7. The method according to claim 1, wherein the method is carried out during operation of the antenna array in an intended application.

8. The method according to claim 1, further comprising the step of training a machine learning model being used for the fault detection and/or localizing of the at least one faulty antenna element.

9. The method according to claim 1, wherein a single machine learning model is used for performing fault detection and for localizing the faulty antenna element.

10. The method according to claim 1, wherein two separate machine learning models are used for performing fault detection and for localizing the faulty antenna element.

11. The method according to claim 1, wherein a fault type of the localized at least one faulty antenna element is determined, using a machine learning technique.

12. A device for detecting and localizing faults in an antenna array, comprising:
at least one processor; and
a memory storing computer-executable instructions that, when executed by the at least one processor, cause the at least one processor to:
perform fault detection on the antenna array to identify the presence of at least one faulty antenna element of the antenna array, wherein the fault detection is performed using a machine learning technique,
determine whether the antenna array is faulty or non-faulty, based on a result of the performed fault detection, and
localize the at least one faulty antenna element if the antenna array is determined to be faulty, using a machine learning technique;
wherein the processor is configured to perform fault detection and to localize the at least one faulty antenna element based on over-the-air measurement data generated by at least one measurement antenna positioned at multiple sampling points around the antenna array; and wherein the machine learning technique used for performing fault detection and the machine learning technique used for localizing the at least one faulty antenna element comprise at least one pre-trained deep neural network model outputting fault detection and localization results for adjusting antenna element weights to restore a target radiation pattern.

13. A test system for testing antenna arrays, comprising:

at least one measurement antenna configured to generate measurement data by measuring radiation from an antenna array at sampling measurement points; and the device according to claim 12 for detecting and localizing faults in the antenna array, using the measurement data generated by the at least one measurement antenna.

\* \* \* \* \*